June 6, 1944.
W. P. LISTON
2,350,404
FLANGE SPREADER
Filed April 27, 1943
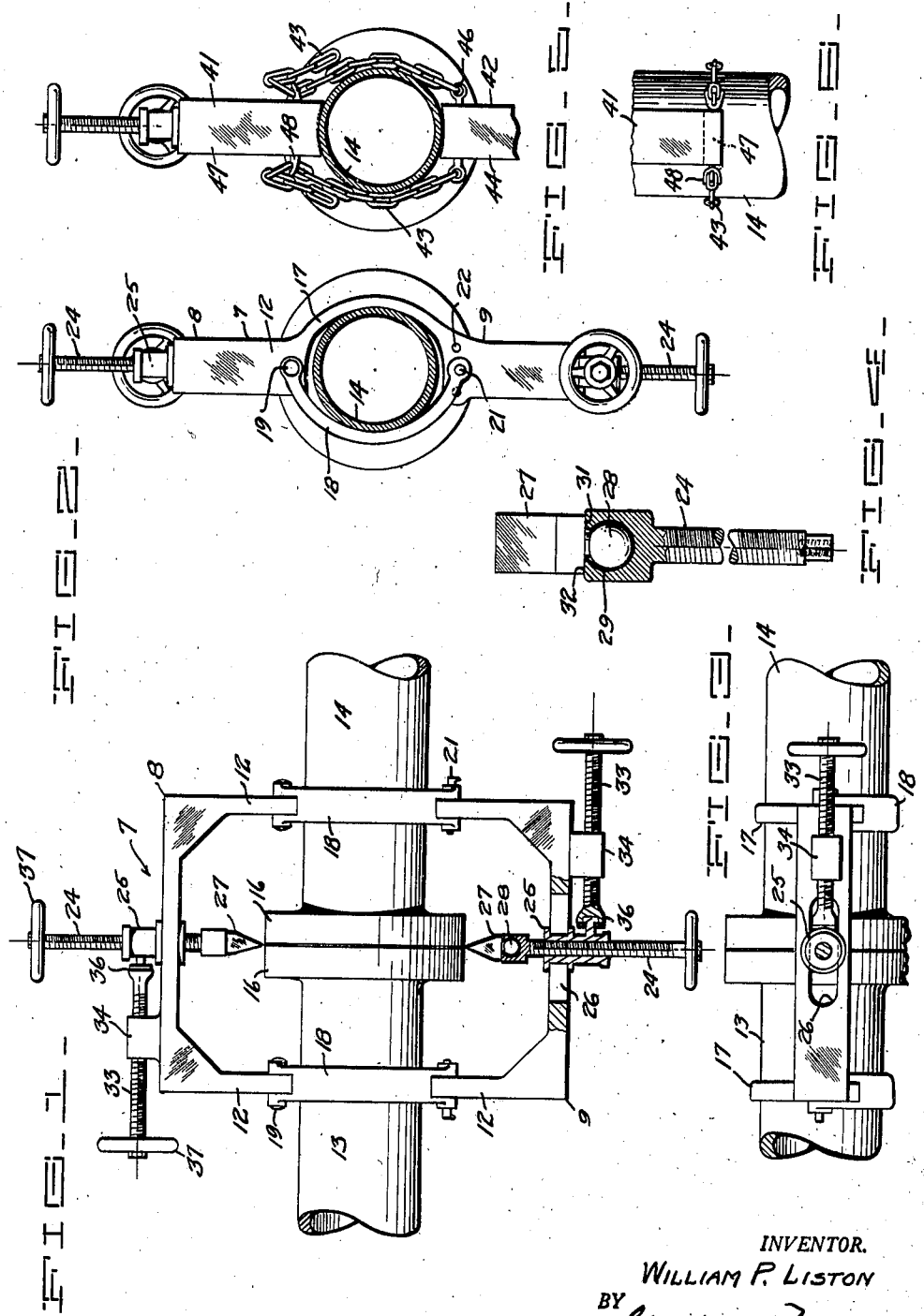
INVENTOR.
WILLIAM P. LISTON
BY Gardner + Warren
his attys.

Patented June 6, 1944

2,350,404

UNITED STATES PATENT OFFICE 2,350,404

FLANGE SPREADER

William P. Liston, Richmond, Calif.

Application April 27, 1943, Serial No. 484,724

6 Claims. (Cl. 254—100)

The invention relates to a device particularly adapted for separating abutting flanges of adjoining pipes and the like.

An object of the invention is to provide a portable device of the character described which may be readily clamped or otherwise removably mounted upon the pipes and having members arranged to be inserted between the flanges, which are adjustably supported for accurate positioning and easy operation.

Another object of the invention is to provide a device of the character described which will effect the flange spreading operation without strain on the device or of the pipes, and yet may be easily operated to spread the flanges to any extent desired.

A further object of the invention is to provide a device of the character described which is very simple in construction, may be easily carried and operated by hand, and may be used for a wide range of different sizes of pipe with one size of the device.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side elevation, partly in section, showing the spreading device of my invention applied to adjoining pipes.

Figure 2 is an end view of the device as shown in Figure 1.

Figure 3 is a bottom plan view of the device as shown in Figure 1.

Figure 4 is an enlarged detailed view of a portion of one of the spreader members, taken at right angles to Figure 1.

Figure 5 is a fragmentary end view similar to Figure 2, but showing a modified form of part of the device.

Figure 6 is a fragmentary top plan view of a portion of the device as shown in Figure 5.

Frequently, and particularly in case of pipe lines formed of heavy and large diameter pipe, the flanges of adjoining pipes become so "frozen" together that even though the fastening means, such as the bolts, are entirely removed, extreme difficulty is encountered when it becomes desirable to remove a pipe section from the line or pry any of the abutting flanges apart in order to replace a gasket therebetween. The difficulty thus encountered, is especially prevalent, where the pipes or the pipe line is anchored in position. With the use of the device of my invention, which may be readily applied to the pipes or line, the separation of the flanges may be readily effected regardless of how firmly the same are held together.

In brief the device comprises a supporting frame arranged to be clamped to the adjoining pipes at opposite sides of the abutting flanges and having two or more bridge portions arranged to span the flanges, there being adjustably mounted on the bridge portions, wedge members which are arranged to be positioned at the meeting point of the flanges and may be operated to move inwardly at such point to force the flanges apart thereat.

More specifically described, the device of my invention as illustrated in Figures 1 to 3, comprises an open frame 7 of generally rectangular form and composed of two or more opposed sections 8 and 9 connected together by side sections 12. The latter are arranged to be clamped or otherwise secured directly to the pipe sections 13 and 14 having the flanges 16 which are to be spread apart. Preferably the sections 12 are designed to form at least in part, the means for clamping the frame to the pipes, and in the embodiment now being described, each of said sections is provided with an integral offset portion 17 in which the pipe may be seated, and a clamping arm 18 which preferably corresponds in shape with the offset portion 17 but is arranged to be mounted and held on the section 12 in opposed relation to the offset so that the pipe may be held firmly therebetween. One end of the arm is hingedly connected to the section 12 by a pivot pin 19 while the other end is designed to be releasably secured to said section by a bolt 21 or the like. By holding the arms outwardly the frame may be readily positioned on or removed from the pipes. It will be noted that with this arrangement for mounting and holding the supporting frame on the pipes, the frame may be applied or removed directly from the side of the pipes so as to thus avoid the necessity of slipping the frame over an end of the pipe. In order that the same frame may be used with equal facility with different sized pipes, the section 12 may be provided with several holes 22 so that the arm 18 may be clamped in various positions.

The sections 8 and 9 of the frame combine with the associated portions of the section 12 to provide yokes, and the frame is arranged to be positioned on the pipes so that such yokes bridge or straddle the flanges of such pipes as clearly shown in Figure 1. Mounted on each of the sections 8 and 9, are the flanges separating members proper, and such members as here shown include threaded stems 24 engaged in correspondingly threaded blocks 25 which are mounted on the sections and supported for movement in slots 26 thereof to permit the blocks to be moved longitudinally thereof. The inner end of the stems extend toward one another and between the side sections 12, and each stem has provided at such ends a sharp edged wedge 27 designed for insertion between the abutting faces of the pipe flanges. The wedges are preferably connected to the stems by a swivel joint so that when the wedges are advanced into engagement with the flange surfaces, the wedges may rotate to a limited extent relatively to stem and thereby adjust itself to any minor misalignment with the stem. As will be clear from Figure 4, the swivel connection between the wedge and stem is made by means of a ball 28 extending from the wedge and engaging loosely in a socket 29 in the stem. It should be noted that when the wedge is held back against the stem, opposing shoulders 31 and 32 of the parts will abut.

Movement of the blocks 25 in the slots, so as to adjust the position of the wedges axially of the pipes, may be effected by means of threaded stems 33 mounted in fixed threaded bosses 34 on the frame sections 8 and 9 and connected by a swivel joint 36 to the blocks 25. Ready gripping of the stems 24 and 33 to effect rotation thereof is afforded by hand-wheels 37 or the like provided at the outer ends of the stems. Preferably the outer end of the stems is formed square in cross-section so that if the situation requires, the hand-wheels may be replaced with a conventional ratchet wrench or other suitable turning device.

A modified form of the supporting frame and the means of clamping the same to the pipes is shown in Figures 5 and 6. In this embodiment, the sections 41 and 42 of the frame arranged to be positioned at the opposite sides of pipe are made separate, but are designed to be held together and to the pipes by means of chains 43. The latter are preferably secured permanently at one end to the side portions 44 of one section by means of eyebolts 46 or the like, while the other end is arranged to be detachably connected to the side portions 47 of the other frame section by means of a fork 48 or the like between the prongs of which the links may be held. As will be clear from Figure 5, the chains serve to clamp the frame portions 44 and 47 against the sides of the pipe, while at the same time the chains likewise engage the pipe. In this manner, the frame may be firmly held in position on the pipes, but any necessary axial displacement of the pipes in the frame will be permitted.

In the use of my device the frame is first clamped in position on the pipes with the opposite yoke portions straddling the flanges connecting the pipes, the wedges being held in a retracted position. The stems 33 are then rotated to move the wedges longitudinally of the pipes and position the wedges directly opposite the abutting faces of the flanges or the gasket which is interposed therebetween. The stems 24 are then rotated to advance the edge of the wedges into the gasket and between the opposing faces of the flanges, and such movement is continued until the desired amount of separation of the flanges is effected. The axial displacement of the pipes in the frame occasioned by the spreading action, will be permitted without strain on the frame since the engagement of the frame with the pipes is such as to allow the pipes to slide therein while retaining a frictional grip therewith, and in any event the design and construction of the frame is such as to enable the side sections to flex to a limited extent to permit the necessary movement of the pipes. After the spreading action has been completed, the stems 24 are rotated to retract the wedges, and the clamps or chains are then released to permit the withdrawal of the frame.

I claim:

1. In a portable device for spreading apart abutting end flanges of adjoining pipe sections, spaced gripping units each formed to embrace the pipe sections inwardly of the flanges, supporting members extending between said gripping units at transversely opposite sides of the sections and in spaced relation from the flanges, and wedge members mounted on said supporting members for adjustment longitudinally of the sections and movable to and from each other for insertion and retraction between the flanges.

2. In a portable device for spreading apart abutting end flanges of adjoining pipe sections, spaced pipe-gripping units each formed with sections arranged for cooperation to embrace the pipe sections at longitudinally opposite sides of the flanges, parallel supporting members extending between and connecting said gripping units and arranged to span the flanges at transversely opposite sides thereof, and wedging members carried by said supports intermediate said gripping units and adjustable longitudinally of the pipe sections and mounted to move toward each other for insertion between the flanges.

3. In a portable device for spreading apart end flanges of adjoining pipe sections, opposed yoke members, means at the ends of the yoke members for connecting said members together and for clamping same to the pipe sections, and flange spreading members mounted on said yoke members for adjustment longitudinally thereof and for movement to and from each other.

4. In a portable device for spreading apart end flanges of adjoining sections of pipe and the like; opposed frame portions, opposed portions fixedly securing said first portions together, means on said opposed portions for clamping same to said pipe sections, a block mounted on each of said first portions for movement thereon, and a wedge carrying member mounted in each of said blocks and for movement to and from each other, and means to hold said members in different positions.

5. In a portable device for spreading apart end flanges of adjoining sections of pipe and the like; opposed yoke members, chains adjustably connecting said yokes together adjacent the ends thereof and arranged for clamping same to pipe with the yokes on opposite sides of the pipe, blocks slidable longitudinally on said yokes, means to move and retain said blocks in position, a stem carried by each of said blocks for movement between said yokes, means to move and hold said stems in position, and a wedge carried by each of said stems at its inner end.

6. In a portable device for spreading apart end flanges of adjoining pipe sections, opposed spaced supporting members, means connecting said members and embracing said pipe at longitudinally spaced points, means carried by each of said members for movement between the members and including a part with a shoulder, and a wedge having a substantially loose universal swivel connection with said part and provided with a shoulder engageable with the first shoulder when the wedge is backed against said part.

WILLIAM P. LISTON.